Figure 1:
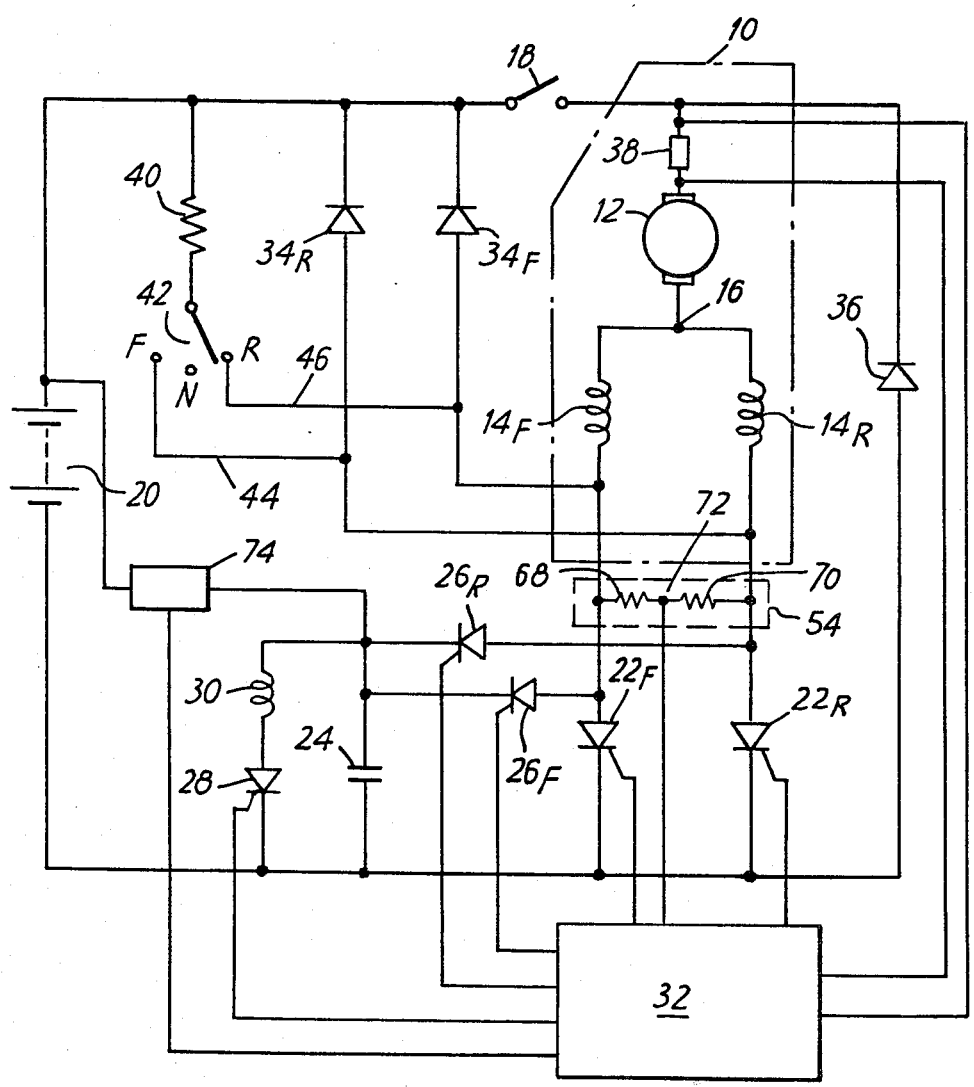

United States Patent [19]

Sloan

[11] 4,384,240
[45] May 17, 1983

[54] REGENERATIVE BRAKING SYSTEM FOR THREE-TERMINAL D.C. MOTOR

[75] Inventor: Albert E. Sloan, Gateshead, England

[73] Assignee: Technical Operations Limited, Gateshead Nell, England

[21] Appl. No.: 243,560

[22] Filed: Mar. 13, 1981

[30] Foreign Application Priority Data

Mar. 18, 1980 [GB] United Kingdom ............... 8009095

[51] Int. Cl.³ .......................... H02P 5/16; H02P 3/14
[52] U.S. Cl. ................................... 318/255; 318/139; 318/376; 318/297
[58] Field of Search ............... 318/255, 376, 258, 262, 318/377, 378, 379, 380, 297, 300, 139

[56] References Cited

U.S. PATENT DOCUMENTS 3,727,118 4/1973 Makino .............................. 318/297
4,104,571 8/1978 Gukwicz et al. .................... 318/380

Primary Examiner—B. Dobeck
Assistant Examiner—A. Evans
Attorney, Agent, or Firm—Wolf, Greenfield & Sacks

[57] ABSTRACT

A pulse control circuit for a three-terminal d.c. series motor having an armature and two oppositely-wound field windings comprises a respective main thyristor in series with each field winding, one or other of the main thyristors being operated at a variable mark-to-space ratio to energize the field winding appropriate to drive the motor in a selected direction. The circuit includes switch means operable to connect the motor in a regenerative braking mode in which the armature and each field winding are connected to the battery in series with a freewheel diode and with a diode across the motor so that charging current can flow from the motor to the battery during regenerative braking. Circuit means are provided to effect initial energization of at least one field winding when the circuit is first switched to the regenerative braking mode.

8 Claims, 3 Drawing Figures

REGENERATIVE BRAKING SYSTEM FOR THREE-TERMINAL D.C. MOTOR

This invention relates to pulse control circuits for d.c. motors.

In particular, the invention relates to pulse control circuits for d.c. series motors provided with switching means by which the connections of the armature and field winding to the battery can be switched so that a braking torque is applied to the motor whilst current is driven by the motor to the battery, so that kinetic energy is extracted from the motor and used to recharge the battery. Such braking is known as regenerative braking.

In d.c. series motors with pulse controllers of the kind comprising a main thyristor in series with the armature and field winding and a freewheel diode in parallel with the armature and field winding, it is known to connect a diode (the "braking diode") in parallel with the armature, field winding and main thyristor and to connect a contactor (the "regenerative braking contactor") between the freewheel diode and the armature, so that regenerative braking can be initiated by opening the contactor at the same time as the connections to the field winding are reversed. Then, when the main thyristor is conducting, current flows through the closed circuit consisting of the armature, field winding and the braking diode so that the motor acts as a short-circuited generator and the current increases. At a predetermined current level the main thyristor is commutated, and current then flows through the armature, field winding, braking diode and freewheel diode to the battery, the current decaying as energy is transferred to the battery. The cycle is repeated, so that a braking torque is applied to the motor in dependence on the mark-to-space ratio of switching of the main thyristor. In such a circuit it is necessary to establish an initial field excitation at the start of regenerative braking, and this is usually achieved by connecting a resistor across the regenerative braking contactor.

Such a circuit has a number of disadvantages:

(1) The resistor across the regenerative braking contactor dissipates considerable power during the whole of the regenerative braking period. Moreover, the resistor may have to carry a relatively high current and is therefore relatively expensive.

(2) When the motor is braked from a high running speed the armature may generate a voltage which is greater than battery voltage, so that, when the main thyristor is non-conducting, the current through the armature, field and battery will increase rather than decaying, thus giving rise to an unstable condition. To avoid this, it is usual to connect a further diode from the armature to the battery to limit the armature generated voltage.

(3) If, owing to a fault, the regenerative braking contactor were to close during regenerative braking, the battery voltage would in effect be added to the armature voltage driving current through the field, causing extremely severe braking.

(4) If the main thyristor failed to commutate during regenerative braking, the current in the loop consisting of the armature, field winding, main thyristor and braking diode would continue to increase, giving rise to an unstable condition and severe braking. To protect against this, it is usually necessary to insert a fuse in series with the braking diode.

It is known to provide a motor with two field windings wound in opposite senses, so that the direction of drive of the motor can be selected by energising one or other of the field windings. Such motors are often referred to as three terminal motors, having one armature terminal and two field terminals, since the junction of the armature with the two field windings is not normally accessible.

This invention consists in a pulse control circuit for a d.c. series motor having an armature and two oppositely-wound field windings, comprising two semiconductor switching devices, such as thyristors, each connected in series with the armature and a respective one of the field windings, means for controlling the mark-to-space ratio of switching of each of the main semiconductor switching devices, one or other of the switching devices being brought into operation in dependence upon the setting of a direction selector thereby to determine the direction of drive of the armature, two freewheel diodes each connected in series with the armature and a respective one of the field windings, switch means operable to connect the motor in a regenerative braking mode in which the armature and each field winding are connected to the battery in series with the associated freewheel diode and with a unidirectional current path so that charging current can flow from the motor to the battery when the armature is rotating in a direction contrary to that selected by the direction selector, and means for effecting initial excitation of at least one field winding on switching of the circuit to the regenerative braking mode.

Preferably, the means for effecting initial excitation of the field winding comprises means for connecting a resistive path between the battery and one or other of the field windings in accordance with the setting of the direction selector, in such a manner that current can flow from the battery through both field windings and the appropriate semiconductor switching device in a direction such that the fluxes in the two field windings are additive, to provide initial field excitation on switching of the circuit to the regenerative braking mode.

The switch means preferably comprises a contactor connected between the armature and the two freewheel diodes. The said unidirectional current path may comprise a diode connected in parallel with the armature, field windings and main thyristors.

Since the initial excitation current on regenerative braking flows through both field windings in such a manner as to make their flux additive, the current required to initiate braking is only half that required in the known circuit discussed above. The power dissipation in the resistor is therefore reduced. There is no danger of instability in the circuit of the invention at high armature speeds, since if the voltage generated by the armature rises above battery voltage it drives current through the non-excited winding and the associated freewheel diode to the battery. This current produces a flux which opposes that of the other field winding, so that the net flux is reduced and the rise in the armature voltage is limited. Moreover, if the braking contactor were to close during braking, it would close the loop consisting of the armature and the non-excited field winding and its associated freewheel diode. Current would therefore be driven through that winding by the armature voltage, generating a flux opposed to that of the other winding, so that the net flux would be reduced, reducing the braking torque and the armature current.

Advantageously, the circuit includes sensing means for sensing the armature current during regenerative braking and means for switching both main thyristors into conduction simultaneously if the current exceeds a predetermined value. Then, if the braking current rises too high, for example due to failure of commutation of a main thyristor in a conducting mode, both thyristors will be rendered conducting simultaneously, so that current will flow through the second field winding, reducing the net flux and thereby reducing the generated armature voltage. A severe braking condition is thereby prevented. Even if one of the main thyristors fails permanently in a conducting mode during regenerative braking, control of braking may be maintained by alternately firing and commutating the other main thyristor, so that the net flux in the motor is reduced when the other main thyristor is conducting.

The pulse control circuit of the invention is particularly useful when employed to control the traction motor of a battery-powered vehicle, such as an industrial truck.

Figure 2:
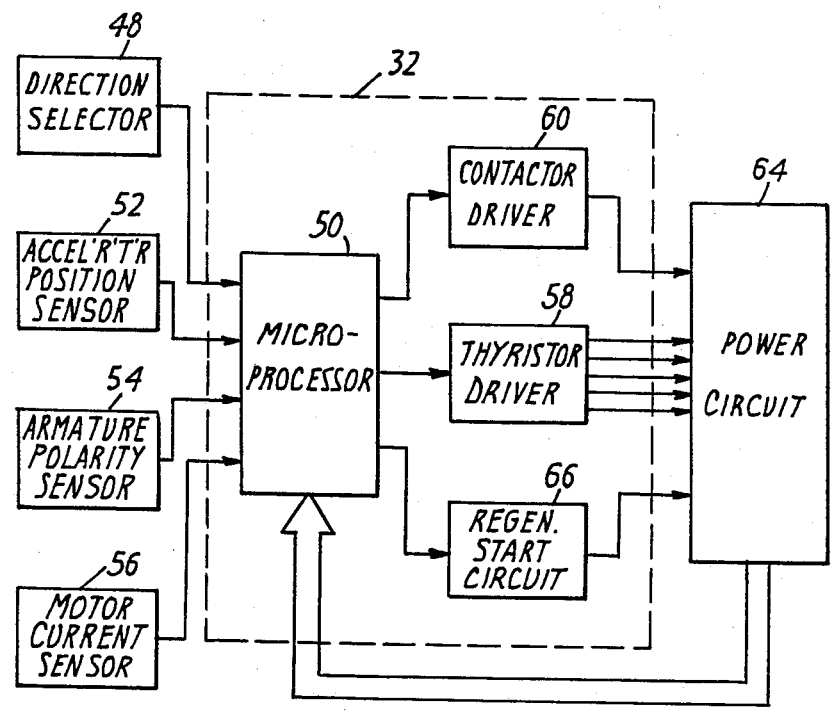
Figure 3:
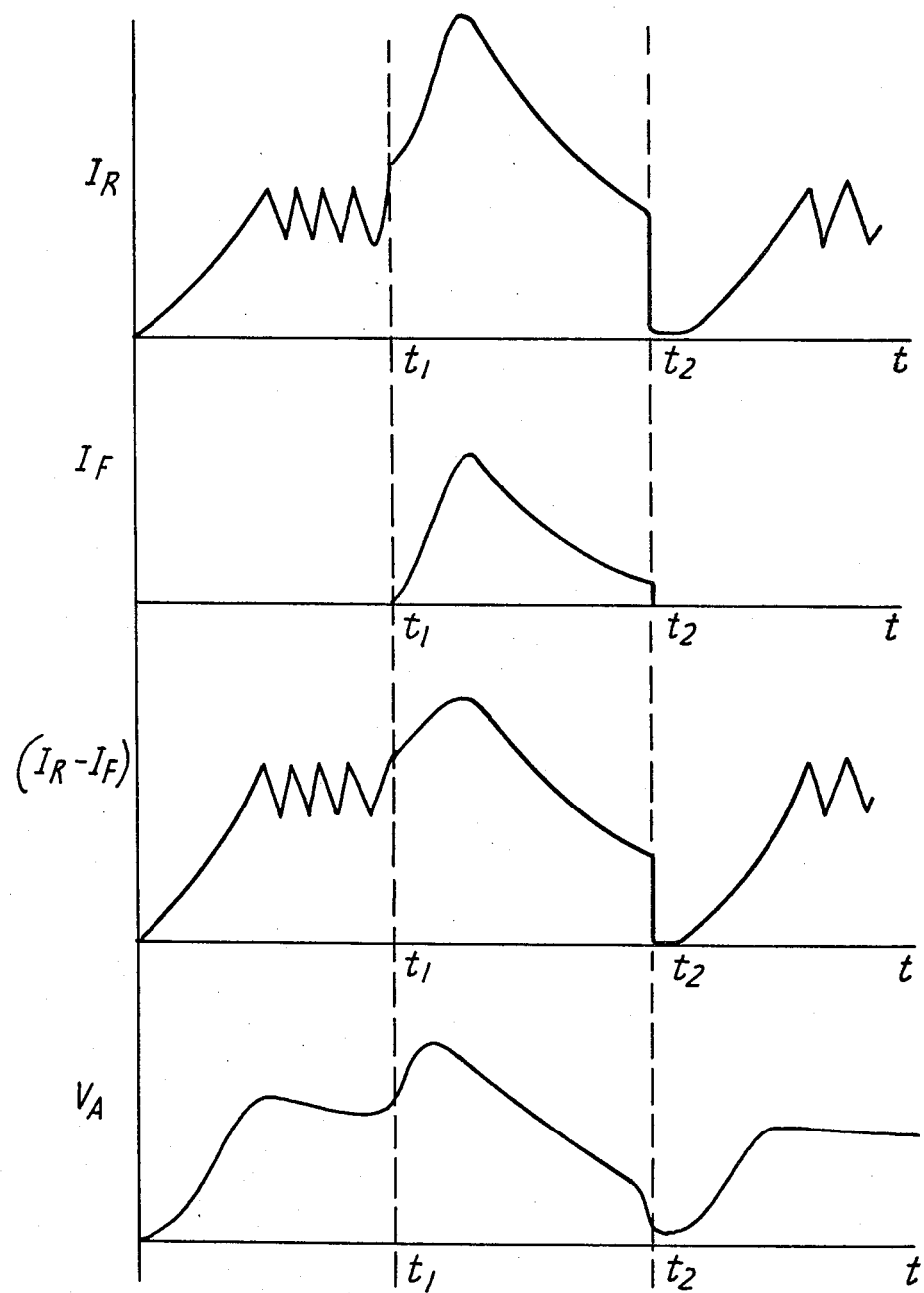

The invention will now be described, by way of example, with reference to the accompanying drawings, in which:

FIG. 1 is a circuit diagram of a three terminal electric motor provided with a pulse control circuit in accordance with the invention, FIG. 2 is a block diagram of part of the circuit of FIG. 1, and FIG. 3 is a graph illustrating the behaviour of field currents and armature voltage in the circuit of FIG. 1 when failure of commutation of a main thyristor occurs during regenerative braking.

Referring to the drawings, a three-terminal motor 10 has an armature 12 and two field windings $14_F$ and $14_R$ connected to one side of the armature 12 at a common point 16. The other side of the armature is connected to the positive terminal of a rechargable storage battery 20 through a normally-open contactor 18. Field windings $14_F$ and $14_R$ are connected separately to the negative terminal of the battery through respective main thyristors $22_F$ and $22_R$, so that they can be separately energised. The field windings $14_F$ and $14_R$ are wound in opposite senses, so that energisation of winding $14_F$ produces a driving torque in the "forward" direction whilst energisation of winding $14_R$ produces a driving torque in the "reverse" direction.

Main thyristors $22_F$ and $22_R$ are provided with a commutation circuit consisting of a common commutating capacitor 24 which is connected in series with a commutating thyristor $26_F$ across main thyristor $22_F$ and in series with a commutating thyristor $26_R$ across main thyristor $22_R$. A charge reversal thyristor 28 is connected in series with an inductor 30 across the commutating capacitor 24. The various thyristors are fired by signals from control circuitry 32. When the motor is to be driven forwards a signal from a direction selector circuit 48 (FIG. 2) causes the control circuitry to pulse main thyristor $22_F$ whilst main thyristor $22_R$ remains commutated.

A freewheel diode $34_F$ is connected across field winding $14_F$, armature 12 and contactor 18. A second freewheel diode $34_R$ is similarly connected across field winding $14_R$, armature 12 and contactor 18.

A diode 36 is connected between the cathodes of the main thyristors $22_F$ and $22_R$ and the junction of the armature 12 and contactor 18. A current shunt 38 connected in series with the armature 12 supplies to the control circuitry 32 a signal proportional to the armature current.

To effect the initial energisation of one or other of the field windings at the start of regenerative braking, a resistor 40 is connected between battery positive and a switch 42 controlled by the direction selector circuit 48. Switch 42 is a three-position switch, having "forward", "reverse" and "neutral" positions. In the "forward" position of the switch 42 the resistor 40 is connected through line 44 to the junction of the "reverse" field winding $14_R$ and the main thyristor $22_R$. In the "reverse" position of the switch 42 the resistor 40 is connected through line 46 to the junction of the "forward" field winding $14_F$ and main thyristor $22_F$. The switch 42 also has a third, "neutral" position in which the resistor 40 is out of circuit.

As shown in FIG. 2, the control circuitry 32 includes a microprocessor 50 which receives inputs from the direction selector 48, an accelerator position sensor 52, an armature polarity detector 54 and a motor current sensor 56. The microprocessor controls firing circuits 58, which supply gating signals to the thyristors $22_F$, $22_R$, $26_F$, $26_R$ and 24 of the power circuit 64, a contactor driver 60, which controls operation of the contactor 18, and a regenerative braking start circuit 66. The direction selector 48 and accelerator position sensor 52 may be of well-known form. The accelerator position sensor 52 may for example comprise a potentiometer coupled to the accelerator pedal of a vehicle driven by the motor 10. The microprocessor 50 and driver circuits 58 and 60 may also take well-known forms. The regenerative braking start circuit 66 includes the resistor 40 and switch 42, or alternatively may comprise electronic circuit means for supplying current to the field windings at the start of regenerative braking.

The armature polarity sensor 54 is provided to sense the polarity of the armature voltage to detect the start of regenerative braking, as described below. Since the junction 16 of the armature 12 and field windings $14_F$ and $14_R$ is not normally accessible, the armature polarity sensor 54 includes two equal resistors 68 and 70 connected in series between the end terminals of the field windings $14_F$ and $14_R$. The junction 72 of the two resistors has in operation a polarity, relative to the cathode of diode 36, which is in the same sense as the polarity of the armature junction 16.

The motor current sensor 56 responds to the voltage across a shunt 38 in series with the armature 12. As described below, sensing the motor current is employed to detect the end of regenerative braking and also to initiate a fail-safe operation if the current rises excessively.

In operation, during normal motoring the regenerative braking contactor 18 is closed, so that diode 36 is reverse biased. To drive the motor forwards, the direction selector 48 is set so that the main thyristor $22_F$ is operated, whilst main thyristor $22_R$ remains non-conducting. Field winding $14_F$ is therefore energised, and the mean voltage applied to the motor is controlled by the main thyristor $22_F$ in the normal way. To effect regenerative braking when the motor armature is rotating in the "forward" direction, the direction selector is set to "reverse", so that main thyristor $22_R$ is rendered conducting whilst thyristor $22_F$ is commutated and remains non-conducting. The regenerative braking contactor 18 is opened as the direction selector is changed over. Switch 42 moves to the "reverse" setting, so that current flows from the battery 20 through the resistor 40, line 46, field winding $14_F$, field winding $14_R$, and main thyristor $22_R$. Since the current flow through field winding $14_F$ is in a direction opposite to that of flow during normal monitoring, its flux is added to that of field winding $14_R$. A voltage is therefore generated by the armature in the opposite direction to that during normal motoring. The polarity of the armature voltage is sensed by circuit 54, and in response to this sensing the control circuitry 32 causes the regenerative braking contactor 18 to be held open. When main thyristor $22_R$ is conducting, the armature generated voltage drives current through the closed loop consisting of the field winding $14_R$, thyristor $22_R$ and diode 36. The current in that loop therefore increases, until main thyristor $22_R$ is commutated. Current then flows through field winding $14_R$, freewheel diode $34_R$, the battery 20 and diode 36. Charging current is thus driven to the battery during non-conducting periods of main thyristor $22_R$, as long as the armature continues to rotate in the "forward" direction. The braking torque on the motor can be controlled by controlling the mark-to-space ratio of switching of the thyristor $22_R$, for example by gating thyristor $22_R$ when the motor current fails to a preset trough level and commutating thyristor $22_R$ when the motor current rises to a preset peak level, so that the mean motor current is maintained at a level between the trough and peak levels. When the end of regenerative braking is detected, contactor 18 is closed and, if the direction switch remains in the "reverse" setting, the motor will be driven in reverse in the normal motoring mode. The end of regenerative braking is detected by monitoring the motor current sensed by shunt 38. At a certain point as the motor loses speed, and the armature-generated voltage falls, the motor current during the "on" period of thyristor $22_R$ will not rise to the preset peak value set by the control circuitry 32. When this occurs, thyristor $22_R$ is commutated and not re-fired, so that the motor current decays. When the current has fallen to the preset trough value, contactor 18 is closed and normal operation is resumed.

If, during regenerative braking, the motor current sensed by shunt 38 exceeds a predetermined value, the control circuitry 32 supplies simultaneous firing signals to both main thyristors $22_F$ and $22_R$. Current therefore flows through both field windings $14_F$ and $14_R$ in the same direction, reducing the flux. The armature generated voltage is therefore limited. Instability and excessive braking torque, due for example to failure of one of the main thyristors in a conducting mode, is therefore prevented. For example, as shown in FIG. 3, if the main thyristor $22_R$ fails to commutate at time $t_1$, the current $I_R$ in field winding $14_R$ continues to increase. On firing the other main thyristor $22_F$ as described, current $I_F$ begins to flow through the field winding $14_F$. This current $I_F$ is driven only by the armature-generated voltage so that current $I_F$ does not increase to the same value as the current $I_R$ in field winding $14_R$, which tends to maintain itself owing to the energy stored in the field. However, the net flux, which is dependent on the difference $I_R - I_F$ is reduced, so that the armature-generated voltage $V_A$ is reduced, and the field currents and armature voltage will eventually decay to zero (FIG. 3 shows the situation in which control of commutation is regained at time $t_2$ before the currents reach zero).

Since, in these conditions, unless control of commutation is regained, the net flux in the motor will fall to zero, and the simultaneous conduction of the main thyristors $22_F$ and $22_R$ removes the initial braking current normally supplied through resistor 40, the braking torque on the motor will also fall to zero. This can be disadvantageous, for example, if the motor is the traction motor of a vehicle which can continue moving under its own inertia. In order to retain some control of the braking after failure of commutation of the main thyristor $22_R$, the control circuitry 32 can be arranged to continue operation of the commutation circuit and at the next commutation point following the firing of both main thyristors $22_R$ and $22_F$ to apply simultaneous gating signals to both the commutating thyristors $26_R$ and $26_F$, so that both main thyristors $22_R$ and $22_F$ are reverse biased by the voltage across the commutating capacitor 24 (assuming that the failure of commutation of thyristor $22_R$ was due to failure of the thyristor itself and not to failure of the commutation circuit). Since, in a fault condition due to commutation failure, the commutating capacitor 24 is not charged in the normal way, a separate charging circuit 74 is connected between battery positive and the capacitor 24, to ensure that the capacitor is charged. The circuit 74 may for example include a transistor switch which is rendered conducting by a signal from control circuitry 32 in a fault condition. If both main thyristors $22_F$ and $22_R$ are successfully commutated following the simultaneous gating of thyristors $22_R$ and $22_F$, the regenerative braking process will be resumed on supply of the next firing pulse to the main thyristor $22_R$. If on the other hand the main thyristor $22_R$ again fails to be commutated, so that it remains conducting whilst the main thyristor $22_F$ is commutated, de-energising the field $14_F$, current will again increase through the closed loop consisting of the armature, field $14_R$, main thyristor $22_R$ and diode 36, so that the braking torque will be re-established. If the current in that loop again exceeds the predetermined value, main thyristor $22_F$ will again be fired, reducing the braking torque to zero as described above. The cycle can then be repeated by supplying gating pulses to the commutation thyristors $22_R$ and $22_F$. By controlling the timing of commutation, the mark-to-space ratio of conduction of the main thyristor $22_F$ can be controlled, thereby controlling the mean braking torque. Thus control of the braking can be maintained, even if one of the main thyristors fails permanently in a conducting mode during regenerative braking.

If, on braking as described above at high armature speeds, the voltage generated by the armature exceeds the battery voltage, the armature generated voltage will drive current through the field winding $14_F$, freewheel diode $34_F$, battery 20 and diode 36, during non-conducting periods of main thyristor $22_R$. The flux generated in field winding $14_F$ will oppose that in field winding $14_R$, so that the net flux, and hence the armature generated voltage will be reduced. Instability, which as discussed above can occur in known controllers, is therefore prevented. Moreover, if contactor 18 were to close during regenerative braking, the armature generated voltage would drive current through field winding $14_F$, freewheel diode $34_F$ and contactor 18, so reducing the net motor flux and preventing instability and excessive braking torque.

It will be apparent that regenerative braking can similarly be effected when the armature is rotating in the "reverse" direction, by changing the direction selector to the "forward" setting.

The application of regenerative braking in accordance with the invention to a pulse control system for a three terminal motor is relatively inexpensive, since it requires only the addition of resistors and a braking diode together with the necessary logic control circuitry, the regenerative braking contactor replacing the line contactor which is normally used with three terminal motor control systems.

It will be appreciated that modifications could be made in the described embodiment, for example the mechanical direction switch 42 could be replaced by an electronic switch, such as an arrangement of transistors or thyristors, adapted to connect resistor 40 selectively to the forward or reverse field winding. Such a switch would have the advantage that it could be arranged to isolate the resistor 40 during normal motoring so that it carried no current.

I claim:

1. A pulse control circuit for a d.c. series motor having an armature and two oppositely-wound field windings, comprising two semiconductor switching devices each connected in series with the armature and a respective one of the field windings, means for controlling the mark-to-space ratio of switching of each of the semiconductor switching devices, one or other of the main semiconductor switching devices being brought into operation in dependence upon the setting of a direction selector thereby to determine the direction of drive of the armature, two freewheel diodes each connected in series with the armature and a respective one of the field windings, switch means operable to connect the motor in a regenerative braking mode in which the armature and each field winding are connected to the battery in series with the associated freewheel diode and with a unidirectional current path so that charging current can flow from the motor to the battery when the armature is rotating in a direction contrary to that selected by the direction selector, means for effecting initial excitation of at least one field winding on switching of the circuit to the regenerative braking mode, sensing means for sensing the armature current during regenerative braking and means for switching both semiconductor switching devices into conduction if the current exceeds a predetermined value.

2. A pulse control circuit for a d.c. series motor having an armature and two oppositely-wound field windings, comprising two semiconductor switching devices each connected in series with the armature and a respective one of the field windings, means for controlling the mark-to-space ratio of switching of each of the semiconductor switching devices, one or other of the main semiconductor switching devices being brought into operation in dependence upon the setting of a direction selector thereby to determine the direction of drive of the armature, two freewheel diodes each connected in series with the armature and a respective one of the field windings, switch means operable to connect the motor in a regenerative braking mode in which the armature and each field winding are connected to the battery in series with the associated freewheel diode and with a unidirectional current path so that charging current can flow from the motor to the battery when the armature is rotating in a direction contrary to that selected by the direction selector, and means for effecting initial excitation of at least one field winding on switching of the circuit to the regenerative braking mode, said means for effecting initial excitation comprising means for connecting a current path between the battery and one or other of the field windings in accordance with the setting of the direction selector, in such a manner that current can flow from the battery through both field windings and the appropriate semiconductor switching device in a direction such that the fluxes in the two field windings are additive, to provide initial field excitation on switching of the circuit to the regenerative braking mode.

3. A pulse control circuit as claimed in claim 2, in which the conductive path includes a resistor.

4. A pulse control circuit for a d.c. series motor having an armature and two oppositely-wound field windings, comprising two semiconductor switching devices each connected in series with the armature and a respective one of the field windings, means for controlling the mark-to-space ratio of switching of each of the semiconductor switching devices, one or other of the main semiconductor switching devices being brought into operation in dependence upon the setting of a direction selector thereby to determine the direction of drive of the armature, two freewheel diodes each connected in series with the armature and a respective one of the field windings, a contactor connected between the armature and the two freewheel diodes and operable to connect the motor in a regenerative braking mode in which the armature and each field winding are connected to the battery in series with the associated freewheel diode and with a unidirectional current path so that charging current can flow from the motor to the battery when the armature is rotating in a direction contrary to that selected by the direction selector, and means for effecting initial excitation of at least one field winding on switching of the circuit to the regenerative braking mode.

5. A pulse control circuit for a d.c. series motor having an armature and two oppositely-wound field windings, comprising two semiconductor switching devices each connected in series with the armature and a respective one of the field windings, means for controlling the mark-to-space ratio of switching of each of the semiconductor switching devices, one or other of the main semiconductor switching devices being brought into operation in dependence upon the setting of a direction selector thereby to determine the direction of drive of the armature, two freewheel diodes each connected in series with the armature and a respective one of the field windings, switch means operable to connect the motor in a regenerative braking mode in which the armature and each field winding are connected to the battery in series with the associated freewheel diode and with a diode connected in parallel with the armature, field windings and semiconductor switching devices so that charging current can flow from the motor to the battery when the armature is roating in a direction contrary to that selected by the direction selector, and means for effecting initial excitation of at least one field winding on switching of the circuit to the regenerative braking mode.

6. A pulse control circuit as claimed in claim 1, in which there are provided sensing means for sensing the armature current during regenerative braking and means for switching both semiconductor switching devices into conduction simultaneously if the current exceeds a predetermined value.

7. A pulse control circuit as claimed in claim 1, in which the means for switching both semiconductor switching devices into conduction is adapted alternately to switch the devices into conduction simultaneously and to commutate both devices simultaneously.

8. A pulse control circuit as claimed in claim 1, in which the semiconductor switching devices comprise thyristors, and the circuit includes means for commutating each thyristor.

* * * * *